United States Patent
Ekici et al.

(10) Patent No.: US 8,391,918 B2
(45) Date of Patent: Mar. 5, 2013

(54) METHOD AND SYSTEM FOR RADIO ACCESS TECHNOLOGY SELECTION

(75) Inventors: Ozgur Ekici, Ottawa (CA); Dimitrios Prodanos, Ottawa (CA); Muhammad Khaledul Islam, Ottawa (CA)

(73) Assignee: Research In Motion Limited, Ontario (CA)

( * ) Notice: Subject to any disclaimer, the term of this patent is extended or adjusted under 35 U.S.C. 154(b) by 0 days.

(21) Appl. No.: 13/170,552

(22) Filed: Jun. 28, 2011

(65) Prior Publication Data

US 2011/0319072 A1   Dec. 29, 2011

Related U.S. Application Data

(60) Provisional application No. 61/359,332, filed on Jun. 28, 2010.

(51) Int. Cl.
*H04M 1/00* (2006.01)
*H04W 40/00* (2009.01)

(52) U.S. Cl. .......... 455/552.1; 455/574; 455/553.1; 455/428

(58) Field of Classification Search .......... 455/574, 455/154.1, 458, 524, 127.5, 41.1, 41.2, 422.1, 455/423, 552.1, 553.1, 428, 435.2–445
See application file for complete search history.

(56) References Cited

U.S. PATENT DOCUMENTS

| | | |
|---|---|---|
| 7,245,913 B1 | 7/2007 | Nguyen et al. |
| 2002/0059434 A1 | 5/2002 | Karaoguz et al. |
| 2005/0254454 A1 | 11/2005 | Ozluturk |
| 2006/0023663 A1 | 2/2006 | Kim et al. |
| 2007/0211624 A1* | 9/2007 | Schmidt et al. ............ 370/225 |
| 2008/0076385 A1 | 3/2008 | Mayer et al. |
| 2008/0102815 A1* | 5/2008 | Sengupta et al. ........... 455/424 |
| 2009/0068969 A1* | 3/2009 | Lindoff et al. ............ 455/161.1 |
| 2009/0207817 A1* | 8/2009 | Montemurro et al. ....... 370/338 |
| 2009/0268654 A1* | 10/2009 | Baglin et al. ................. 370/311 |
| 2009/0282127 A1* | 11/2009 | Leblanc et al. ............. 709/219 |
| 2010/0062800 A1 | 3/2010 | Gupta et al. |
| 2010/0293253 A1* | 11/2010 | Kaida ........................ 709/219 |

FOREIGN PATENT DOCUMENTS

| | | |
|---|---|---|
| EP | 2114108 A1 | 11/2009 |
| WO | 2006103571 A1 | 10/2006 |
| WO | PCT/JP2009/052349 | * 8/2009 |

OTHER PUBLICATIONS

International search report for corresponding PCT application No. PCT/CA2011/000741 dated Sep. 19, 2011.

* cited by examiner

*Primary Examiner* — Kent Chang
*Assistant Examiner* — Nelson Rosario
(74) *Attorney, Agent, or Firm* — Gowling Lafleur Henderson LLP

(57) ABSTRACT

A method and a multi-mode mobile communication device operating said method are provided. The method comprises a multi-mode mobile communication device selecting a first data connection carried over a first radio access technology (RAT) based on a first requested QoS, and the multi-mode mobile communication device selecting a second data connection over a second RAT based on a second requested QoS. The multi-mode communication device comprises a first transceiver adapted to be connected to a server using the first RAT, a second transceiver adapted to be connected to the server using the second RAT, and a processor for carrying out the method.

10 Claims, 7 Drawing Sheets

METHOD AND SYSTEM FOR RADIO ACCESS TECHNOLOGY SELECTION

CROSS-REFERENCE TO RELATED APPLICATIONS

This application is related to and claims priority from U.S. Provisional Application Ser. No. 61/359,332, filed on Jun. 28, 2010, entitled "Method and System for Operating a Multi-mode Mobile Communication Device", the entire disclosure of which is hereby incorporated by reference for all purposes as if fully set forth herein.

The present patent disclosure relates generally to network and/or radio access technology (RAT) selection by a multi-mode mobile communication device, and more specifically, to network and/or RAT selection by the multi-mode mobile communication device while in simultaneous coverage of one or more networks using two or more RATs.

BACKGROUND

A multi-mode device that has performed association and registration with multiple RAT networks, such as cellular and WLAN, can be addressed by these networks independently. A typical implementation of a multi-mode device will require the device to monitor all networks to which the device is registered for incoming data.

Different RATs may provide respective advantages when in communication with the multi-mode device. A cellular RAT may have a low wake-up frequency in idle mode and a wide coverage area. A WLAN RAT may have a higher wake-up frequency in idle mode and a limited coverage area, but may provide higher data rates than cellular RATs and is preferred for applications that benefit from a high data rate. From a power consumption perspective, cellular RATs are generally more efficient for multi-mode devices while in idle mode. However, WLAN RATs are generally more efficient when transmitting at high data rates. In addition, user experience during data activity is generally better over WLAN RATs.

A multi-mode mobile device in simultaneous coverage of two or more RATs may not operate optimally. Each RAT may have one or more advantages over other RATs, such as power consumption, latency, data rate, coverage area, tariffs, reliability, etc. There have been some efforts aimed to reduce power consumption of a multi-mode device by optimizing the interaction between the multi-mode device and a network. For example, a Power-efficient Communication Protocol was proposed (http://www.antd.nist.gov/pubs/Slee-Power-Efficient-icc06.pdf) to turn off the WLAN interface after a multi-mode device enters the idle state, and uses existing paging of a cellular RAT in order to wake up the WLAN interface. Unfortunately, this approach requires coordination between multiple core network elements, including specific signaling and data transfer between network elements, which is difficult and costly to implement.

BRIEF DESCRIPTION OF THE DRAWINGS

These and other features of the patent disclosure will become more apparent from the following description in which reference is made to the appended drawings wherein:

FIG. 6 (b) illustrates an example of increase of TIM periods;

FIG. 6 (c) illustrates selective reception of the wake up signals;

DETAILED DESCRIPTION OF PREFERRED EMBODIMENTS

Figure 1:
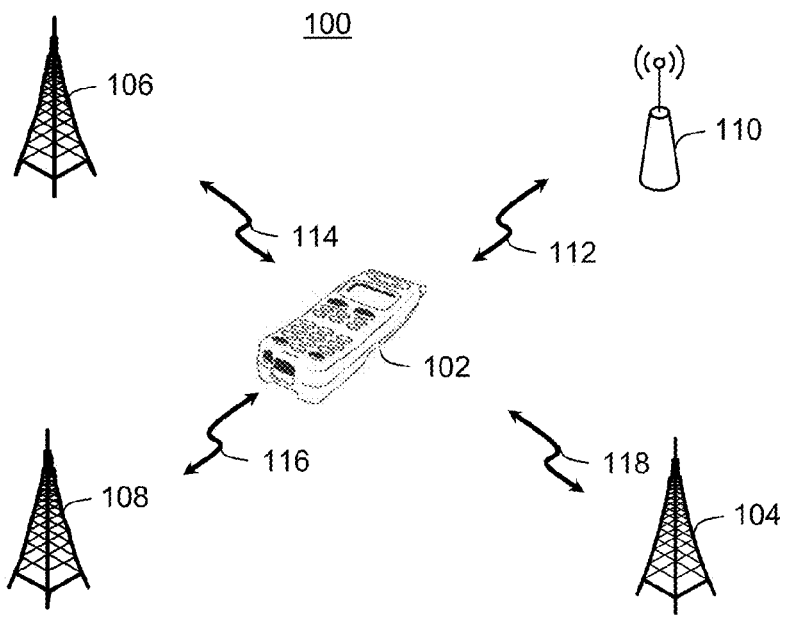
FIG. 1 is an overview of a network in which an embodiment of the present patent disclosure may be implemented.

In accordance with one aspect of the present patent disclosure there is provided a network selection method comprising: a multi-mode mobile communication device selecting a first data connection carried over a first radio access technology (RAT) based on a first requested QoS; and the multi-mode mobile communication device selecting a second data connection over a second RAT based on a second requested QoS.

In one embodiment, the method further comprises: receiving a notification of a data transmission with the second requested QoS destined for the multi-mode mobile communication device through the first data connection over the first RAT; and switching from the first data connection over the first RAT to the second data connection over the second RAT.

In another embodiment, the method further comprises: upon receiving the notification, establishing a first data call on the first RAT and commencing the data transmission through the first data connection over the first RAT; and establishing a second data call on the second RAT and activating the second data connection over the second RAT; and switching the data transmission from the first data connection over the first RAT to the second data connection over the second RAT; and receiving the data transmission with the second requested QoS through the second data connection over the second RAT.

In another embodiment, the method further comprises: returning to the first data connection after a termination of the data transmission with the second requested QoS; and awaiting notification of new data transmission destined for the multi-mode mobile communication device through the first data connection over the first RAT.

In another embodiment, the method further comprises: configuring a server of data transmission destined for the multi-mode mobile communication device to use the first data connection while there is no data to be transmitted, and the second data connection while there is data is to be transmitted with the second requested QoS.

In another embodiment, the first RAT is a cellular radio access technology, and the second RAT is a wireless local area network radio access technology.

In another embodiment, the first RAT is a wireless local area network radio access technology, and the second RAT is a cellular radio access technology.

In another embodiment, the first RAT is a first cellular radio access technology, and the second RAT is a second cellular radio access technology.

In another embodiment, the first RAT is a first wireless local area network radio access technology, and the second RAT is a second wireless local area network radio access technology.

In accordance with another aspect of the present patent disclosure there is provided a method by a multi-mode mobile communication device comprising: selecting a first data connection based on a first criteria while there is no data to be transmitted, said first data connection carried over a first network utilizing a first radio access technology (RAT); selecting a second data connection based on a second criteria while data is being transmitted, said data connection carried over a second network utilizing a second RAT; requesting a first QoS from a wireless network or transport architecture while there is no data to be transmitted; and requesting a second QoS from a wireless network or transport architecture while data is transmitted.

In accordance with another aspect of the present patent disclosure there is provided a multi-mode mobile communication device comprising: a first transceiver adapted to be connected to a server using a first radio access technology (RAT); a second transceiver adapted to be connected to the server using a second RAT; and a processor for selecting a first data connection carried over a first radio access technology (RAT) based on a first requested QoS, and selecting a second data connection over a second RAT based on a second requested QoS.

In accordance with another aspect of the present patent disclosure there is provided a multi-mode mobile communication device comprising: a first transceiver adapted to be connected to a server using a first radio access technology (RAT); a second transceiver adapted to be connected to the server using a second RAT; and a processor for selecting a first data connection based on a first criteria while there is no data to be transmitted, said first data connection carried over a first network utilizing a first radio access technology (RAT), selecting a second data connection based on a second criteria while data is being transmitted, said data connection carried over a second network utilizing a second RAT, requesting a first QoS from a wireless network or transport architecture while there is no data to be transmitted, and requesting a second QoS from a wireless network or transport architecture while data is transmitted. The first and second networks are considered to be different networks regardless of whether or not they are operated by the same carrier. The first and second RATs may be the same or different RATs.

Reference will now be made in detail to some specific embodiments of the patent disclosure. Examples of these specific embodiments are illustrated in the accompanying drawings.

Multi-mode mobile communication devices, hereinafter generally referred to as multi-mode devices, have the capability to provide communication service on multiple radio access technologies (RATs) simultaneously or one at a time. The term "radio access technology" (RAT) in the present disclosure is intended to include any wireless technology which provides access to a network. Examples of RATs currently supported by a multi-mode device may include second generation (2G) wireless communication systems such as Global System for Mobile communication (GSM), General Packet Radio Service (GPRS), Interim Standard 95 (IS-95); third generation (3G) systems such as CDMA2000 1x and 1xEV-DO, and Universal Mobile Telecommunication System (UMTS) including High-Speed Packet Access (HSPA) and evolved HSPA (HSPA+); fourth generation (4G) systems such as Long Term Evolution (LTE). In addition to these RATs which operate on licensed spectrum and are typically known as cellular RATs, a multi-mode device may support different variants of IEEE 802.x-based RATs such as WiFi and WiMAX, and provide Wireless Local Area Network (WLAN) service on unlicensed spectrum. Furthermore, a multi-mode device capable of supporting Unlicensed Mobile Access (UMA) can roam and handover between cellular and WLAN RATs. The teachings of the present disclosure also apply to other examples of current generations of RATs and future generations of RATs.

Different technologies offer different benefits to end users. For instance, UMTS Wideband Code Division Multiple Access (WCDMA) cellular networks typically provide wide coverage area with data rates of up to 384 kbps (release 99) or higher (e.g., evolved High-Speed Packet Access, HSPA+) while wireless local area networks can support very high connection speeds (currently up to 600 Mbps) in a limited coverage area. Other examples of benefits to end users include lower tariffs, lower latency, higher reliability, etc., on different RATs. Networks operated by the same carrier are considered to be different networks for the purposes of this disclosure.

The term "multi-mode device" as used in the present disclosure includes any wireless mobile communication device which can use RATs of two or more different RAT types. A single-mode device that can access two or more instances of the same RAT type (e.g. two WCDMA networks) could also benefit from the teachings of the present disclosure.

The term "idle mode" as used in the present disclosure includes any mode that indicates an operation mode where no further data is expected to be sent to or received from the multi-mode device for a prolonged period (e.g., "idle mode", "power save mode", "dormant mode", "sleep mode", "long discontinuous reception (DRX) mode", "Cell_PCH state", "URA_PCH state", etc.). One skilled in the art would appreciate that there may be signalling messages between the multi-mode device and the RAT during the idle mode, and that the mobile device "wakes up" periodically to monitor if there is data intended for the mobile device.

The term "active mode" as used in the present disclosure includes any mode that indicates an operation mode where data is being sent to or received from the multi-mode device (e.g., "active mode", "connected mode", "continuous reception mode", "short DRX mode", etc.).

The term "data connection" as used in the present disclosure describes an end-to-end logical link between a multi-mode device and a network node (for example, an e-mail server). The connection may require high data rate for application such as video streaming or low data rate for applications such as, e-mail or calendar synchronization.

The term "data transmission" is intended to describe a session where the active data connection is transmitting packet data stream, or any other forms of data stream. The term "data session" is synonymous.

The term "data call" is intended to describe a state where radio link resources are assigned and active between the multi-mode device and the wireless network using the associated RAT. A data call can be either mobile originated (MO) or mobile terminated (MT), meaning it is initiated by the multi-mode device or the wireless network respectively. A data transmission requires an active data call in order to transmit packet data.

The multi-mode device may support one or more simultaneous data connections, over one or more RATs. In each case, the data connection provides a logical address, for example but not limited to, an IP address, that allows data to be transferred between the multi-mode device and other network nodes. The network nodes can use any one of the addresses assigned to the multi-mode device in order to communicate data, but will typically use just one, which is usually the address most recently used by the multi-mode device. The current patent disclosure can apply to either type of network node, one that maintains multiple addresses and data connections per multi-mode device, or one that maintains just a single address and data connection per device.

Each data connection is carried over a particular wireless network and its associated RAT, and can only be used while the multi-mode device is in the coverage area of the RAT. When in the coverage area of more than one wireless network, the multi-mode device can use of any of several data connections to transfer data. The multi-mode device can also use different data connections and RATs for different data services. Multi-mode devices will typically prefer the same data connection and RAT, regardless of whether the device and data connection are in active mode or idle mode.

Referring to FIG. 1, a multi-RAT communication environment 100, in accordance with an embodiment of the present patent disclosure is illustrated. In this system, a multi-mode device 102 is able to communicate with multiple wireless network RATs such as wireless local area network (WLAN) where an access point (AP) 110 is shown, and a cellular UMTS/WCDMA network where a base station or node-B 106 is shown. Nodes 104 and 108 may be any other cellular network nodes, for example but not limited to, a base station of GSM/GPRS/EDGE and eNode-B of LTE. Further examples for different cellular systems may include other wireless metropolitan or wide area networks (WMAN or WWAN), such as WiMAX and CDMAOne/CDMA2000, etc. As a non-limiting example, multi-mode device 102 can communicate with GSM/EDGE 104, WCDMA 106, LTE 108, or WLAN 110. Thus, multi-mode device 102 may transmit voice or data signals using any of the supported RATs simultaneously. For uninterrupted services, the multi-mode device 102 may be required to track the communication activities of a number of networks, the number may range from 2, up to any practical number of supported modes.

A multi-mode device when in the coverage area of multiple networks with multiple RATs, may not communicate efficiently and optimally. For example, from a power consumption point of view, it is costly for a multi-mode device to continuously monitor the status and data activity of multiple data connections.

As used in this patent disclosure, where the optimization criteria is the non-limiting example of power saving, the first network and RAT generally has a low wake-up frequency in idle mode, wide coverage area, lower throughput and is suitable for low data rate and idle mode operations; the second network and RAT has higher wake-up frequency in idle mode, limited coverage area, higher throughput and is suitable for high data rate operations. The present patent disclosure would also apply even if both networks share the same RAT type, provided the optimization criteria would select the first network for idle mode and the second network for active mode, based on the network RAT settings and coverage. In this case, a single-mode device could also benefit from the current invention.

For illustrative purposes and as a non-limiting example, the multi-mode device 102 may support WLAN and WCDMA technologies and it is in the coverage area of access point (WLAN) 110 and Node-B (WCDMA) 106. While in idle mode, the multi-mode device 102 must wake up periodically to monitor for downlink data activity in both RATs independently. For the exemplary WCDMA network, this is achieved through periodic monitoring of paging indicator channel (PICH), where the multi-mode device wakes up its receiver and decodes PICH message to see if there is a call, packet or voice call for itself. This is also called discontinuous reception (DRX), where the device turns off its radio between paging cycles to reduce battery consumption. A typical paging cycle configuration for WCDMA networks is 1.28 seconds, compared with a typical wake-up cycle of 100 milliseconds for WLAN. Monitoring WLAN in addition would decrease battery life compared with monitoring WCDMA alone.

Figure 2:
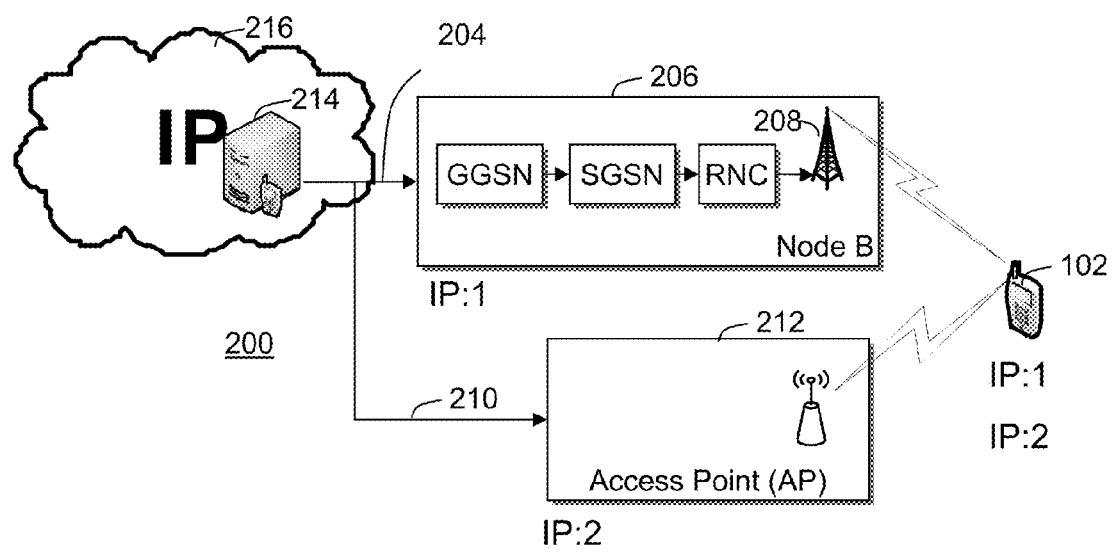
FIG. 2 depicts a multi-network wireless communication system in which an embodiment of the present patent disclosure may be implemented.

Referring to FIG. 2, an exemplary network infrastructure 200 in which the embodiments of the present patent disclosure may be illustrated. As can be seen, a multi-mode device 102 that is registered (i.e., associated/attached/etc.) to both WLAN/WCDMA networks can obtain network IP addresses and be addressed by either network through either a first or a second IP address. A first data connection 204 with its corresponding first IP address is established over a WCDMA network 206 using a PDP context activation procedure, and a second data connection 210 with its corresponding second IP address is established over a WLAN network access point 212 using a Dynamic Host Configuration Protocol (DHCP). Both data connections provide an interface to the IP based network 216 and the data server 214. The server 214 is illustrated as a single server in FIG. 2, it should be apparent to a person skilled in the art that multiple servers may also be used.

In accordance with one embodiment of the present patent disclosure, the multi-mode device 102, connected through a plurality of RATs to the server 214, and after considering one or more criteria, may choose a first data connection 204 over a first RAT, to monitor the data activity in idle mode and/or low data rate applications. For example, the multi-mode device may select a WCDMA network and RAT with a longer Discontinuous Reception (DRX) cycle and/or lower overhead technology for downlink paging (wake-up cycle), but then switch to a WLAN network and RAT that supplies high data rates for applications like video streaming, ftp download, etc., when needed. More generally, a first RAT is prioritized over a second RAT after considering a first optimization criteria, for example but not limited to, power saving, tariff, call set-up latency, concurrency with other services, and a QoS requirement. The arrival of data at the multi-mode device is monitored on the first RAT in the idle mode. When a data connection is active, a second optimization criteria (for example but not limited to, data throughput requirement, power saving, tariff, data packet latency, data packet jitter, concurrency with other services, a QoS requirement and bandwidth optimization) may be considered. The second RAT may then be selected over the first RAT for the ongoing data session.

The server 214 and the multi-mode device 102 may share a common protocol to communicate with each other for selecting a preferred data connection. This would be the case for servers that support more than one data connection simultaneously per multi-mode device. Such a protocol allows the multi-mode device 102 to request a preferred RAT for use in communications, based on an optimization criteria, for a given data activity or idle mode operation. Other servers may only support one data connection at a time and typically this data connection is the one most recently used by the multi-mode device.

This is in stark contrast to typical operation of a multi-mode device without the present invention. In this case, a multi-mode device would use all of its data connections whether or not there are ongoing data transmissions, and would need to monitor all of its data connections during idle mode for incoming, i.e. mobile terminated (MT) data calls. Specifically, if a multi-mode device activates a data connection on a particular network and RAT, it will continue to monitor this data connection for incoming calls during any idle mode periods on said network and RAT, even if another network and RAT is currently preferred for data transmissions.

Figure 3:
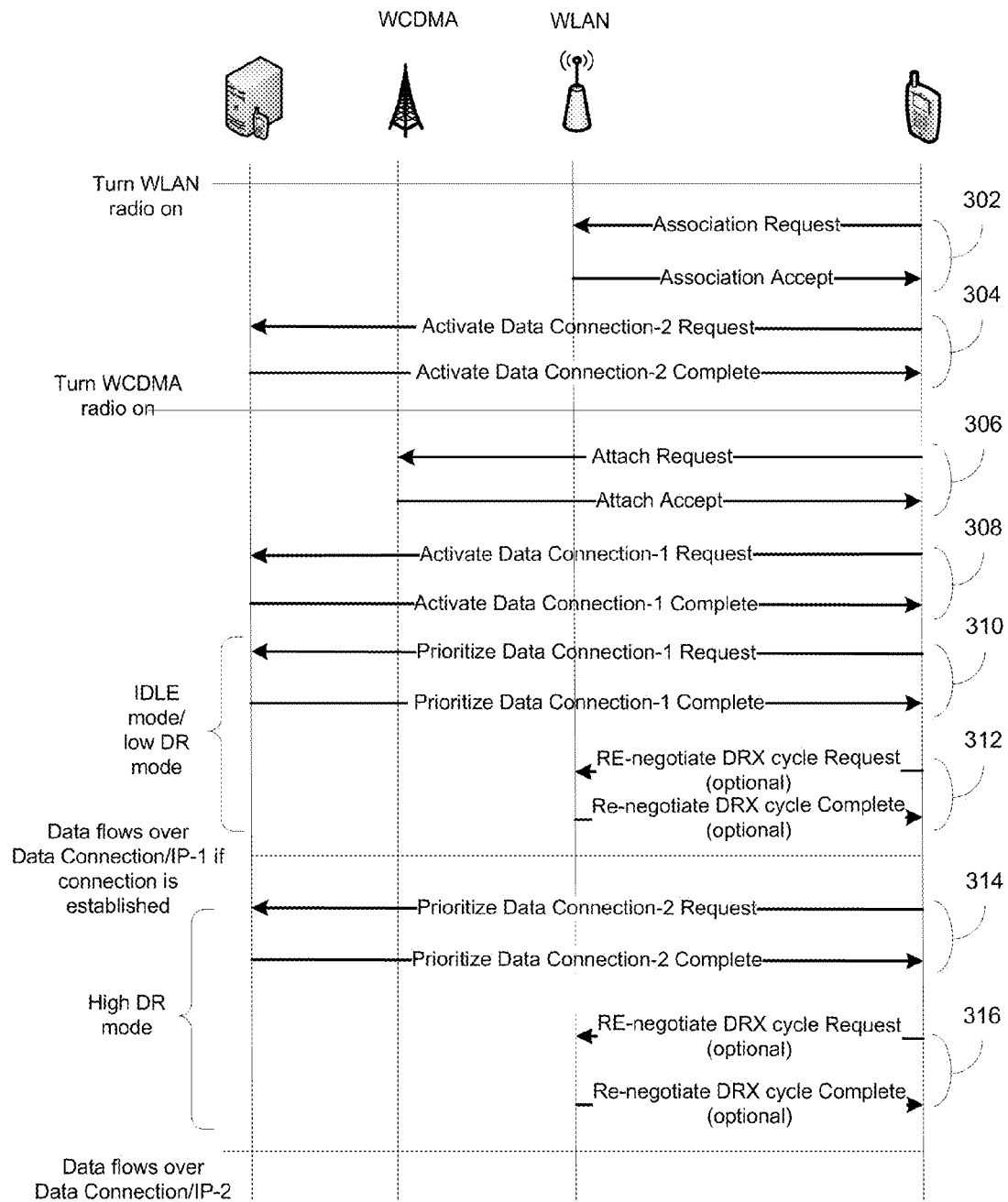
FIG. 3 is a flow chart showing an embodiment using the exemplary multi-mode device in a system as illustrated in FIG. 2.

FIG. 3 is a flow chart showing an embodiment of the present patent disclosure using the exemplary multi-mode device 102 in a network 200 as illustrated in FIG. 2. The multi-mode device 102 turns on WLAN and WCDMA interfaces sequentially. After turning on WLAN interface, the multi-mode device 102 associates 302 with the access point 212, obtains an IP address if necessary (e.g. DHCP), and activates 304 the second data connection 210 between the server 214 and the multi-mode device 102. After turning on the WCDMA interface, the multi-mode device 102 attaches 306 with the Node B 208 and activates 308 the first data connection 204 between the server 214 and multi-mode device 102. It should be apparent to a person skilled in the art that the WCDMA and WLAN interfaces could be activated in either order, or even simultaneously, and that FIG. 3 simply describes one such possibility.

Referring to FIG. 2 and FIG. 3, after considering the first criteria, for example, a possible battery saving, the multi-mode device 102 in the idle mode may prefer and prioritize 310 the first data connection 204 and requests that the server 214 use the first data connection 204 through the WCDMA network. Therefore, the multi-mode device 102 removes the requirement to monitor network activities on the battery intensive WLAN network in idle mode, as no data is expected to arrive over the second data connection 210 over the WLAN network. The multi-mode device 102 may completely power down the WLAN radio, or otherwise reduce the frequency of monitoring. The multi-mode device 102 may or may not trigger a disassociation process with the WLAN network.

When a data transmission is initiated by the server 214, the currently preferred data connection 204 using the WCDMA network 206 is used to begin the transmission. If the multi-mode device 102 then prioritizes the second data connection 210 based on a second optimization criteria (e.g. higher data rate, shorter transfer time, lower energy per transfer, lower tariff, etc.), it will switch to the second data connection 210 over the second network 212, e.g. WLAN RAT. This will involve activating the WLAN radio of the multi-mode device 102, and possibly re-associating and reactivating the data connection 210, depending on the current state of the connection. The server 214 will also switch to the second data connection 210 after receiving the first data packet over this data connection. The multi-mode device 102 may optionally use an explicit signaling protocol over one or both data connections to inform the server 214 about the switch, and/or suspend and resume the data transmission during the switchover.

Figure 4:
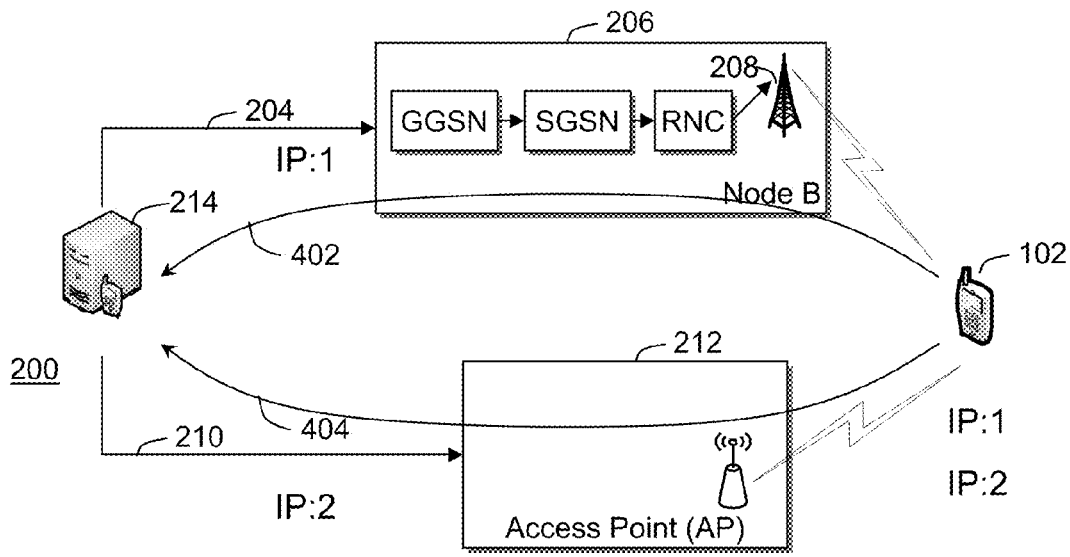
FIG. 4 illustrates the mobile originated data communication.
Figure 5:
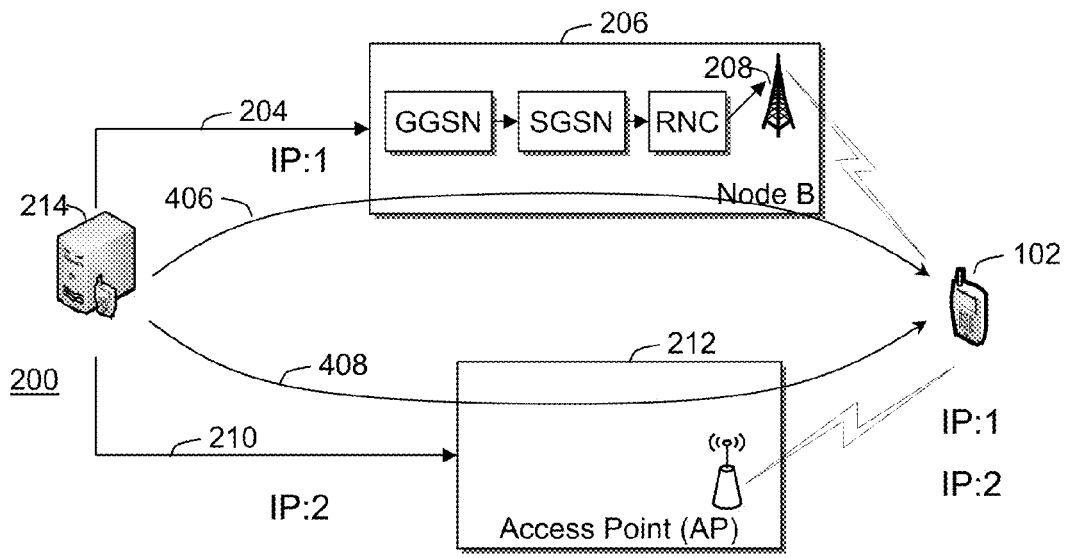
FIG. 5 illustrates the mobile terminated data communication.

Referring to FIG. 4 and FIG. 5, a data transmission between the multi-mode device 102 and the server 214 can be either mobile originated on the uplink 402, 404 or mobile terminated on the downlink 406, 408. The behavior for these two examples differs. The difference in behavior is due to the fact that the server 214 located in the network can monitor traffic activity constantly on either of the data connections 204, 210 (i.e. IP addresses IP:1 and IP:2).

Referring to FIG. 4, if the data transmission is mobile originated 402, 404, then the multi-mode device 102 can choose which data connection to send the data on, based on the second optimization criteria (e.g. higher data rate, shorter transfer time, lower energy per transfer, lower tariff, etc.). If the multi-mode device 102 selects the first data connection 204 over the first network, for example, WCDMA RAT 206, then the device initiates the data transmission using the first data connection 402. Once the data transmission is complete, the multi-mode device 102 reverts to idle mode and continues to prioritize the first data connection based on the first optimization criteria.

If, after considering the second criteria, the multi-mode device 102 selects the second network, e.g. WLAN RAT 212, then the device can immediately initiate the data transmission over the second data connection 404. This will involve activating the WLAN radio of the multi-mode device 102, and possibly re-associating and reactivating the data connection 210, depending on the current state of the connection. Once the data transmission is complete, the multi-mode device 102 reverts to idle mode, but first switches back to the first data connection 204 (i.e. WCDMA RAT 206) based on the first optimization criteria, and requests that the server 214 also use the first data connection for any future mobile terminated data transmissions.

Referring to FIG. 5, if the data transmission is mobile terminated, then the server will use the first data connection 204 to initiate the data transmission over the first RAT 406, as this is the RAT the multi-mode device 102 is using to monitor for incoming data while in idle mode. After the data call is established on the first RAT, the multi-mode device 102 will select a data connection and RAT for the (remaining) data transmission, based on a second optimization criteria. If the decision is to continue to use the first RAT 406, then the already established data call continues until the transmission ends, and the device reverts to idle mode using the first data connection.

If the multi-mode device 102 selects the second RAT after considering the second criteria, it will switch to the second data connection 210 over the second network, e.g. WLAN RAT 212. This will involve activating the WLAN radio of the multi-mode device 102, and possibly re-associating and reactivating the data connection 210, depending on the current state of the connection. The server 214 will also switch to the second data connection 210 after receiving the first data packet from the multi-mode device 102 over this data connection. The multi-mode device 102 may optionally use an explicit signaling protocol over one or both data connections to inform the server 214 about the switch, and/or suspend and resume the data transmission during the switchover.

In accordance with one embodiment of the present invention, a multi-mode device in the coverage area of multiple networks, based on a first optimization criteria, will monitor a single preferred network and RAT in order to receive incoming data transmissions. With no requirement to monitor the other networks, the multi-mode device can reduce or eliminate network monitoring activities and thereby improve battery life. The multi-mode device can power down all radios associated with the unused networks and RATs. The multi-mode device can alternately reduce the frequency of monitoring unused networks, decreasing the amount of radio activity while in the idle state. The frequency can optionally be chosen to minimize the likelihood of becoming unknown (e.g. deregistered, disassociated, unattached, disconnected, etc.) in the network, based on the protocols of the associated RATs. Remaining known in a network has the benefit of reducing the latency in starting data calls and initiating/transitioning data transmissions in this network and RAT. The multi-mode device can alternately explicitly remove itself from the unused networks by following the appropriate procedures (e.g. deregister, disassociate, detach, disconnect, etc.) of the associated RATs.

Using the exemplary embodiments of WCDMA as the first network RAT and WLAN as the second network RAT as illustrated in FIG. 2 and FIG. 3, and power saving as the first optimization criteria, the multi-mode device 102 may also avoid monitoring paging notifications relayed on beacon messages of associated access point 212 by two different approaches: i) by renegotiating 312 the wake-up cycle with the access point 212 as will be described below; and ii) ignoring a subset of beacon messages, and lowering the frequency of messages that are monitored/received to the minimum level required to avoid disassociation with the access point. The second approach also saves the multi-mode device 102 additional re-association process. The second approach is possible as the multi-mode device 102 does not expect any packet from WLAN network after steering data connection on to WCDMA network.

Figure 6:
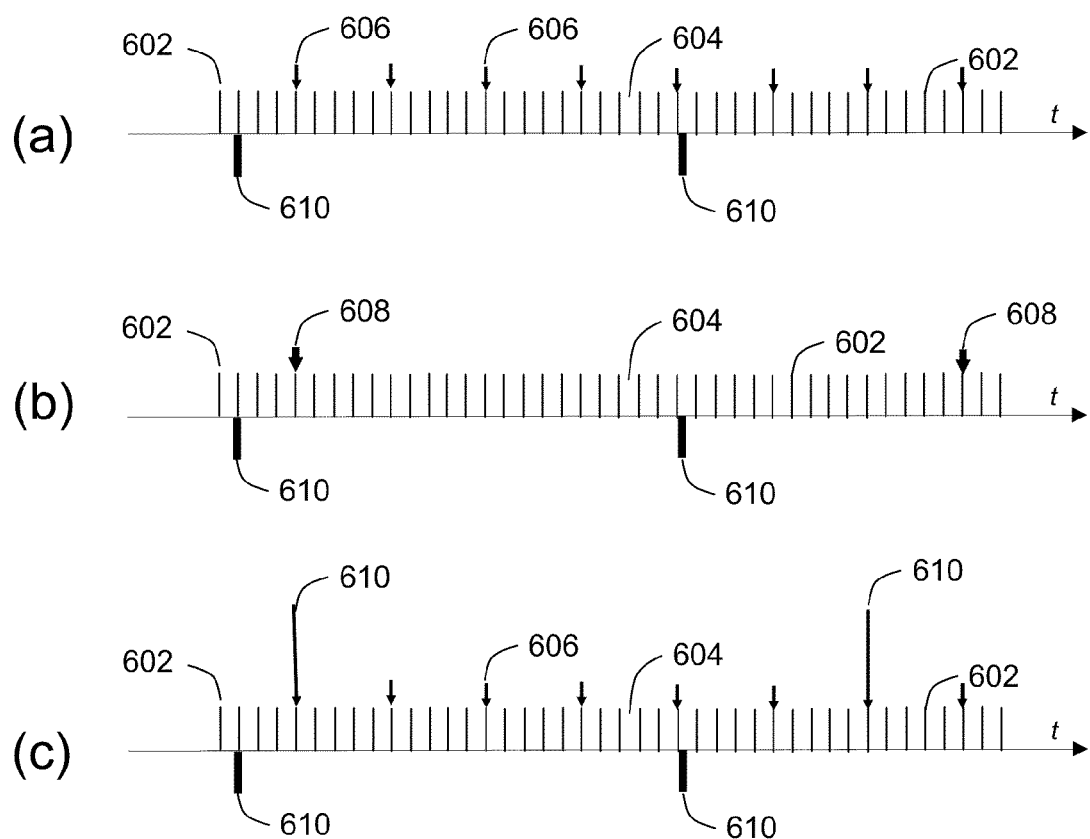
FIG. 6 (a) illustrates an example of TIM periods.

Referring to FIG. 2 and FIG. 6 (a), the access point 212 of the second RAT and the multi-mode device 102 exchange management signals. The management signals from the access point 212 may include a value for broadcast transmission interval 604, for example, a beacon interval in WLAN, representing the amount of time between beacon transmissions. Before the multi-mode device 102 enters idle mode as described below, multi-mode device 102 needs the transmission interval to know when to wake up to receive the beacon message, and learn whether there are buffered frames at the access point 212 for itself. The management signals from the access point 212 may further include a timestamp. After receiving a management signal, for example a beacon frame, the multi-mode device 102 uses the timestamp value to update its local clock. This process enables synchronization among all multi-mode mobile communication devices that are associated with the same access point. The management signals may further include, for example, in WLAN, a Service Set Identifier (SSID) for identifying a specific WLAN.

The multi-mode device 102 associates with the access point 212 to gain full access to the network, by sending an Association Request. The Association Request carries information about the multi-mode device 102, for example but not limited to, supported data rates, and the SSID of the network it wishes to associate with.

The access point 212 processes the Association Request. The access point 212 grants association and responds with an Association Response including a successful status code, and the Association ID to identify the station for delivery of buffered frames when in idle mode.

The multi-mode device 102 in idle mode monitors beacon frames for indications concerning data buffered at the access point 212. In WLAN, this is determined by a Traffic Indication Message period value which specifies how often a beacon frame includes a Traffic Indication Message for a considered multi-mode device, and this number is included in each beacon frame as part of the Traffic Indicator Map (TIM). For example, referring to FIG. 6 (a), each beacon frame 602 may include a TIM period of 5 and every fifth beacon frame 602, as indicated by arrows 606, may include a TIM including the considered multi-mode device. TIM identifies client devices for which unicast (dedicated) traffic is pending and buffered in the access point 212, and includes an indication whether broadcast or multicast traffic is pending.

Upon entering idle mode, the multi-mode device 102 may transmit a notification to the access point 212, so that the access point 212 will know how to handle unicast traffic destined for the multi-mode device 102. The multi-mode device 102 will begin to sleep according to the TIM period, as explained above.

FIG. 6 (b) illustrates the increase of the TIM period from 5, as indicated by 606 in FIG. 6 (a) to 35, as indicated by 608, after an association or re-association request with an increased "Listen Interval" is received at the access point 212. It should be conceivable that the TIM may be increased to infinite, thereby setting the multi-mode device 102 to terminate the communication on the WLAN.

Alternatively, and referring to FIG. 6 (c), the beacon interval 604 may remain the same, but the multi-mode device 102 ignores some beacon messages and listens beacon messages 610 with an alternate frequency.

The need for power saving in a battery-powered multi-mode device 102 may increase over time as the battery drains, therefore, the receive interval of the management signal may be tuned based on the battery level of the multi-mode device 102. More generally, as apparent to a person skilled in the art, the receive interval of the management signal may be tuned according to a plurality of internal or external factors, such as the usages of the first wireless communication mode and second wireless communication mode in the network 100, the cost of data transfer in the first wireless communication mode and second wireless communication mode, type of data connection/application, data rate, connection condition etc.

Figure 7:
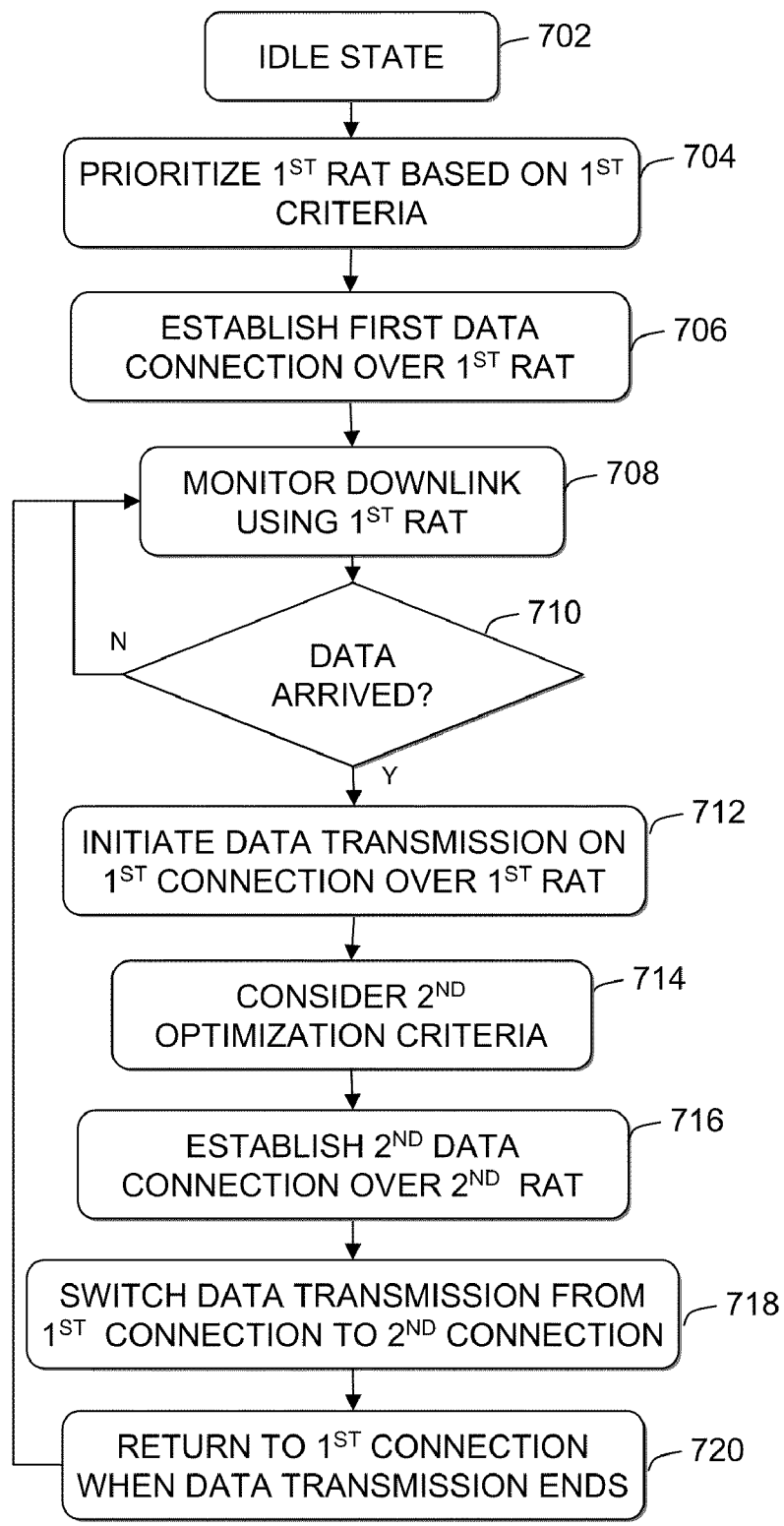
FIG. 7 depicts an exemplary method of selecting a preferred data connection in accordance with one embodiment of the present patent disclosure.

Referring to FIG. 7, the method of selecting a preferred data connection after considering an optimization criteria, for example, but not limited to, power saving, communication type, data rate and idle mode operation is illustrated. The method selects between multiple networks, specifically a first and second network for operation in the idle and active modes respectively, based on the characteristics and configurations of their associated RATs. This includes the case of both first and second RATs being of the same type, e.g. WCDMA, if their characteristics and/or configurations would result in different selection decisions by the multi-mode device.

In FIG. 7, the first RAT has first characteristics for selection based on a first criteria, for example but not limited to: power saving, tariff, call set-up latency, concurrency with other services, a QoS requirement, a low wake-up frequency, wide coverage area, and lower throughput and is suitable for low data rate and idle mode operations. An example of the first RAT may be, but is not limited to WCDMA. The second RAT has second characteristics for selection based on a second criteria, for example but not limited to: data throughput, data transfer time, power saving, tariff, data packet latency and jitter, concurrency with other services, a QoS requirement, higher wake-up frequency, limited coverage area, higher throughput and is suitable for high data rate operations. An example of the second RAT may be, but is not limited to WLAN. In this example, the first WCDMA RAT is preferable to the second WLAN RAT for idle mode operations, when considering a particular optimization criteria, for example, long battery life.

The multi-mode device is assumed to be in the coverage of multiple wireless networks and their associated RATs, at least a first RAT and a second RAT. Upon detecting both RATs, the multi-mode device may connect (e.g. associate, attach, register, etc.) to both RATs. The multi-mode device is in an idle state 702, i.e. no significant data is being transmitted, although network and RAT specific signaling messages may be exchanged between the network and the multi-mode device 102 from time to time.

A first RAT is prioritized based on a first criteria 704, for example but not limited to: power saving, tariff, call set-up latency, concurrency with other services, and a QoS requirement. A first data connection is then established over the first RAT 706. The multi-mode device monitors for the arrival of data 708 using the first data connection over the first RAT. The first RAT indicates (e.g. signals, page, etc.) the arrival of pending downlink data 710 for the multi-mode device, and sets up a first data call for the pending data transmission 712. However, after considering the second optimization criteria 714, a second data call and data connection may be established over the second RAT 716. The data transmission is then switched from the first data connection to the second data connection 718. When the data transmission terminates, the multi-mode device returns to the first data connection over the first RAT 720.

Figure 8:
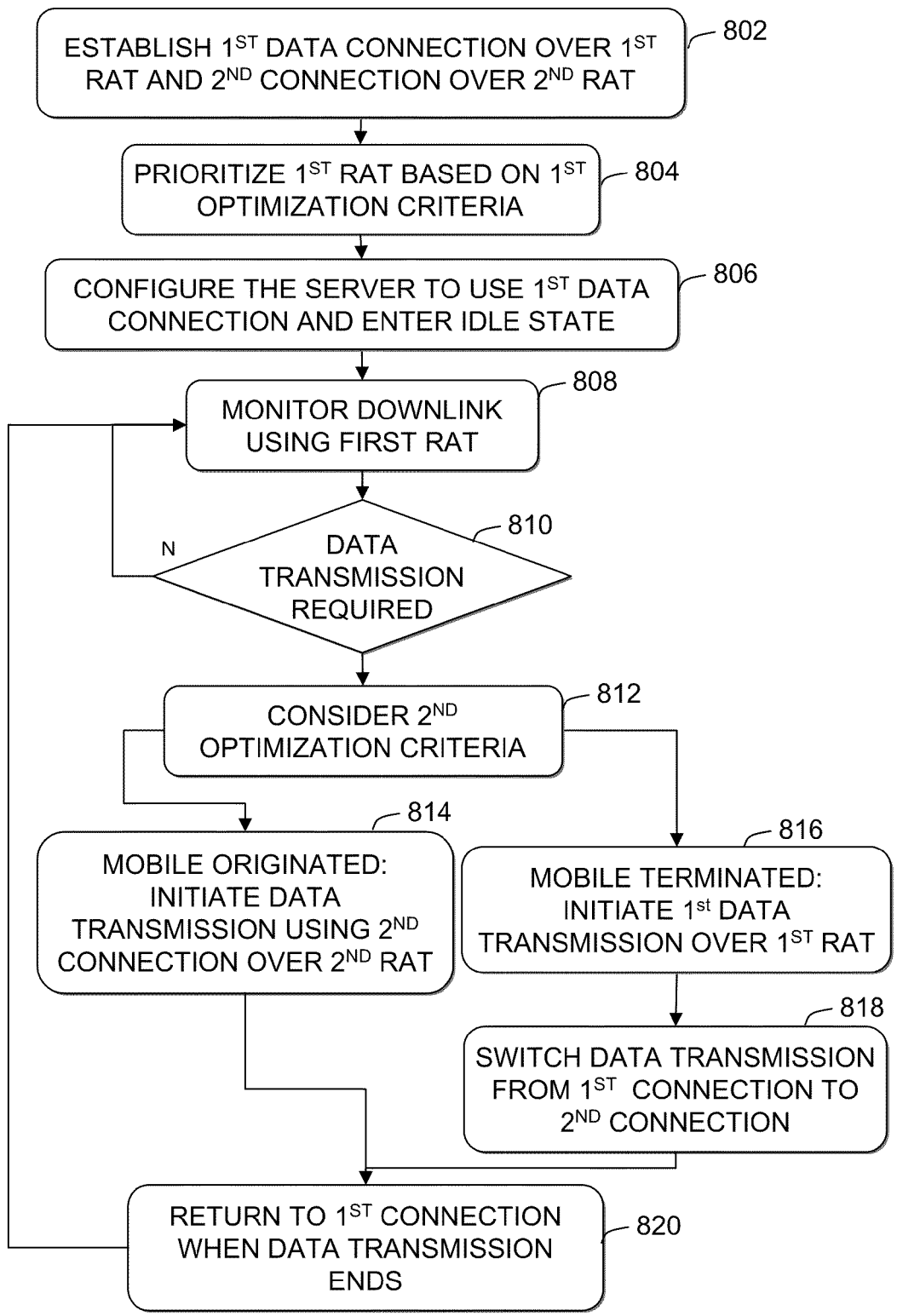
FIG. 8 depicts an exemplary method of selecting a preferred data connection in accordance with another embodiment of the present patent disclosure.

FIG. 8 illustrates another embodiment of the present patent disclosure. In this non-limiting example, in the presence of two networks and RATs, for example, a first WCDMA network and a second WLAN network, a multi-mode device 102 associates and attaches to both RATs, in order to be properly addressed and located in both wireless networks. A first data connection over the first RAT and a second data connection over the second RAT are established 802 between the server 214 and the multi-mode device 102. Unless there is an immediate data activity the device typically goes to idle mode in both RATs. In the example of WLAN and WCDMA, considering the lower DRX and corresponding battery saving, the device may choose to prioritize and select the first RAT, in this example, WCDMA, for idle mode operation. Based on a first criteria, the first data connection over the first RAT is selected 804 to monitor for any upcoming data transmissions 808 and the server is configured accordingly 806. When a data needs to be transmitted between the mobile device and the server 810, a second optimization criteria may be considered 812. If the second data connection over second RAT is chosen, there are two scenarios: for mobile originated data transmission, the multi-mode device initiates the data transmission using the second data connection over the second RAT 814; for mobile terminated data transmission, the data transmission may initially take place over the original first data connection over the first RAT 816, and then switch to the second data connection over the second RAT 818. When the data transmission is terminated, the monitoring of the arrival of data returns to the first data connection 820.

In the above example, the multi-mode device performs an evaluation to select the operational RAT for idle mode based on the first criteria such as power saving for the mobile device. It should be apparent to a person skilled in the art that many optimization criteria may be used to select the first RAT for idle mode operation, and similarly (either same or different criteria) select the second RAT for active mode operation. Example criteria include, but are not limited to, power saving, coverage area, reliability, tariff, connection type, application type triggering the data connection, call set-up latency, data rate requirement, data transfer time, concurrency with other services, connection condition, QoS requirement etc.

For example, the call set-up requirement of the main application of the device may decide the preferred operational RAT for idle mode. For example, Push To Talk (PTT) typically requires very low latency in setting up calls. If PTT is the primary application on a multi-mode device, the multi-mode device may choose not to utilize the proposed battery-saving algorithm, but rather select the RAT with a shorter DRX as PTT requires very short call set-up times. In yet another embodiment, the tariff for the service may dictate which connection and RAT to use, for example, the prioritized first RAT may provide less expensive or even free services (e.g. free incoming calls) compared with the second RAT.

In yet further embodiments, the state of the first RAT and the second RAT may be considered as one of the optimization criteria; or the concurrency of other services with the current service. An ongoing data transmission or voice call on either RAT would optionally prioritize that RAT for any other services, removing the need to monitor the other RAT for the duration of the ongoing voice or data call. For the example of WCDMA and WLAN, an ongoing PTT voice call on the second WLAN RAT may trigger a decision by the multi-mode device to temporarily shift all other data services to the second data connection from the previously prioritized first data connection, removing the need to monitor the first WCDMA RAT for incoming data calls.

The examples presented above also focused on packet switched connection where there is no interaction or presence of other connection types like circuit switched calls, for example, voice or video telephony calls, or PTT type of connections. Different combinations of these scenarios may be evaluated by the multi-mode device. The multi-mode device may also select the active mode RAT and data connection based on the optimal battery usage. As an example, if there is an ongoing circuit-switched voice connection on the first RAT, then the multi-mode device might decide to also use the first RAT for packet connectivity at the same time, utilizing the already active and operational transceiver for packet data communications. In this scenario, using the second RAT for packet data communications would engage an additional transceiver for WLAN, draining the battery faster.

Furthermore, there may be a plurality of criteria being considered when prioritizing the data connections, for example, a first criteria being considered may be power saving, and a second criteria being considered may be a data rate in the data connections.

In general, the mobile device evaluates a plurality of RAT and available data connections, and decides the preferred operational RAT after considering one or more optimization criteria, and inform the server to transmit the data on the preferred operational connection.

The present patent disclosure is also applicable to more sophisticated network or transport architectures that are themselves capable of supporting and switching between a plurality of RATs. The network or transport architecture may be implemented in the network, the mobile device, or both. Such a network architecture may implement a transport layer or other mechanism that would determine the preferred operational RAT, for example selecting between different RAT for different application services with different data transmission requirements. Typically, these networks optimize RAT selection for the available and subscribed application services, but do not usually differentiate between an active and an idle service.

A multi-mode mobile device operating in such a network may indicate different data transmission requirements for the same available service depending on whether that service is currently active. The different data transmission requirements may in turn cause the network or transport architecture to select different RATs. For example, the multi-mode mobile device may indicate a low minimum requirement for a particular service while there is no active data transmission, and be directed by the network or transport architecture to a first RAT to monitor for upcoming data transmissions. Upon activating a data transmission in either direction, the multi-mode mobile device can indicate a higher minimum requirement for the now active service, and be directed by the network or transport architecture to a second RAT to continue the data transmission.

It should be apparent to one skilled in the art that a multi-mode mobile device supporting and operating in such a network can still influence and determine the selection of a RAT by judicious choice of the indications and inputs to the network or transport architecture mechanism controlling RAT selection. One embodiment of the present patent disclosure may select a first RAT while there is no data to be transmitted by selecting a first set of indications and inputs, and select a second RAT during an active data transmission by selecting a second set of indications and inputs.

In a non-limiting example, the multi-mode mobile device could indicate a very low data throughput requirement while there is no data to be transmitted, and be directed to select a first RAT, for example but not limited to, a WCDMA network with lower DRX cycle to monitor for upcoming data transmissions. During an active data transmission, the multi-mode mobile device could update the minimum data throughput requirement to a higher value, and be directed to switch to a second RAT, for example but not limited to, a WLAN network with higher data rates.

In general, the multi-mode mobile device could indicate one or more criteria, for example, but not limited to, minimum data rate, data rate, call setup latency, data latency, jitter, guaranteed delivery, reliability, tariff, power saving, or other QoS requirement.

Figure 9:
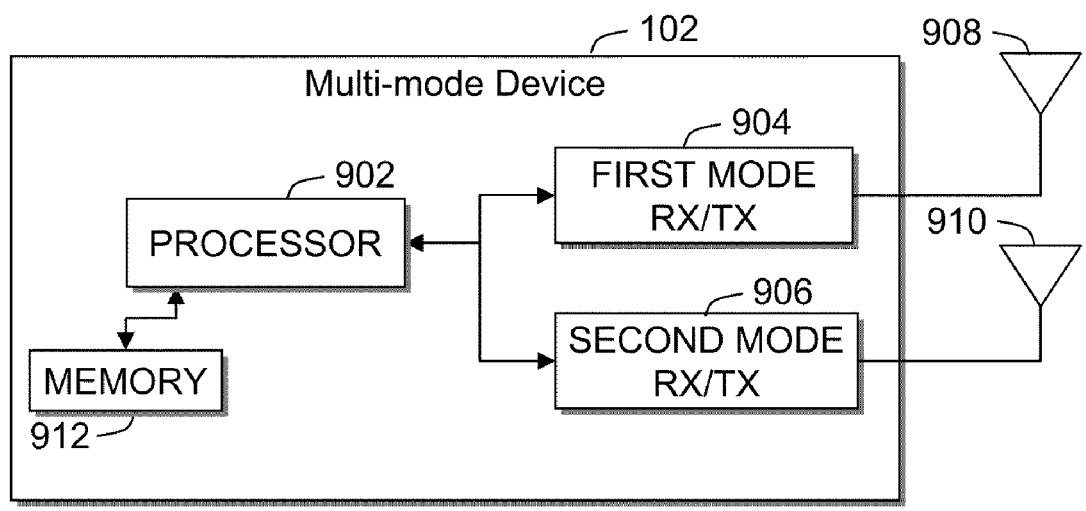
FIG. 9 shows a multi-mode device in accordance with an embodiment of the present patent disclosure.

Referring now to FIG. 9, in accordance with an embodiment of the present patent disclosure, a multi-mode device 102 is shown. The multi-mode device 102 may be a portable or a mobile telephone, a Personal Digital Assistant (PDA), a wireless video or multimedia device, a portable computer, an embedded communication processor or other wireless communication device.

The multi-mode device 102 comprises a processor 902 for carrying out operational processing for the multi-mode device 102. The multi-mode device 102 also has a first transceiver 904 for providing wireless communication via a first RAT, for example but not limited to, WCDMA; and a second transceiver 906 for providing wireless communication via a second RAT, for example but not limited to, WLAN. The present invention may also be generalized to any multi-mode device 102 that supports more than two transceivers and/or RATs.

Each of the transceivers 904 and 906 typically includes an antenna 908, 910, a modulation/demodulation section (not shown), and a coding/decoding section (not shown), for example, as will be known to a skilled person and thus will not be described further herein. The transceiver 904 and 906 are coupled to the processor 902.

The processor 902 may be a single processor or may comprise two or more processors carrying out all processing required for the operation of the multi-mode device 102. The number of processors and the allocation of processing functions to the processing unit is a matter of design choice for a skilled person. The multi-mode device 102 also has a program memory 912 in which programs containing processor instructions for operation of the multi-mode device 102 are stored. Specific program elements stored in program memory 912 may include a selector for selecting operational RAT. The multi-mode device 102 further includes a optimizer for considering the optimization criteria.

The selector receives indications that both transceivers 904 and 906 are receiving and transmitting signals in their respective RAT. For example, the second transceiver 906 receives and transmits a WLAN signal while the first transceiver 904 receives and transmits a WCDMA signal. The multi-mode device 102 determines that with no active data transmission, the second transceiver 906 in idle mode consumes more battery power than the first transceiver 904. Accordingly, the multi-mode device 102 can communicate with the IP server in the network (e.g. e-mail server) to prioritize the data connection provided by the first transceiver 904. The multi-mode device 102 may deactivate and power down the second transceiver 906, and may also optionally indicate this via explicit signaling to the network and RAT provided by the second transceiver 906. In another embodiment, the multi-mode device may optionally re-negotiate with the wireless network and RAT provided by the second transceiver 906 to increase the DRX period. In the exemplary WLAN, the request may be in the form of a Listen Interval in the Association or Re-association request or through any other method for other RATs. After receiving Association or Re-association response from the WLAN network, the selector monitors the management signal (beacon frame) via the second transceiver 906 at increased time intervals. At the same time, the selector monitors the first transceiver 904 for incoming data transmissions. This may include using a low overhead technology (e.g. WCDMA) for downlink paging. Once an active data transmission is in progress, the selector may select the first transceiver 904 for communicating data, for example, preferring to use transceiver 904 for low data rate applications, or the selector may switch to the second transceiver 906, for example, preferring to use transceiver 906 for high data rate applications such as video streaming, ftp download, etc.

Further, although two separate transceivers 904 and 906 are illustrated in FIG. 9. It should be apparent to a person skilled in the art that a single transceiver with a single interface may also provide more than one RAT.

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the above description, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

The terminology used herein is for the purpose of describing particular embodiments only and is not intended to be limiting of the patent disclosure. As used herein, the singular forms "a", "an" and "the" are intended to include the plural forms as well, unless the context clearly indicates otherwise. It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

It is further understood that the use of relational terms such as first and second, and the like, if any, are used solely to distinguish one from another entity, item, or action without necessarily requiring or implying any actual such relationship or order between such entities, items or actions.

The flowchart and block diagrams in the figures illustrate the architecture, functionality, and operation of possible implementations of systems, methods and computer program products according to various embodiments of the present patent disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some portions of the detailed description in the above are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the above discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmit session or display devices.

Embodiments within the scope of the present patent disclosure can be implemented in digital electronic circuitry, or in computer hardware, firmware, software, or in combinations thereof. Apparatus within the scope of the present patent disclosure can be implemented in a computer program product tangibly embodied in a machine-readable storage medium for execution by a programmable processor; and method actions within the scope of the present patent disclosure can be performed by a programmable processor executing a program of instructions to perform functions of the patent disclosure by operating on input data and generating output. Embodiments within the scope of the present patent disclosure may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present patent disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). It should be understood that embodiments of the present patent disclosure may be used in a variety of applications. Although the present patent disclosure is not limited in this respect, the methods disclosed herein may be used in many apparatuses such as in the transmitters, receivers and transceivers of a radio system. Radio systems intended to be included within the scope of the present patent disclosure include, by way of example only, cellular radiotelephone communication systems, satellite communication systems, two-way radio communication systems, one-way pagers, two-way pagers, personal communication systems (PCS), personal digital assistants (PDA's), notebook computers in wireless local area networks (WLAN), wireless metropolitan area networks (WMAN), wireless wide area networks (WWAN), or wireless personal area networks (WPAN, and the like).

What is claimed is:

1. A method, in a mobile communications device capable of operating using a first radio access technology (RAT) and a second RAT, the method comprising:
   operating the device in idle mode;
   prioritizing the first RAT over the second RAT based on a first optimization criteria;
   establishing, over a first network using the first RAT, a first connection to a network node;
   in response to an indication, on the first RAT, of a pending data session:
      considering a second optimization criteria;
      establishing, over a second network using the second RAT, a second connection to the network node in response to the considering of the second optimization criteria;
      prioritizing the second data connection based on the second optimization criteria;
      initiating the pending data session, with the network node, over the second data connection; and
   upon completion of the data session, returning to idle mode and prioritizing the first data connection based on the first optimization criteria.

2. The method of claim 1, wherein the pending data is mobile-originating on an uplink.

3. The method of claim 1, wherein the pending data is mobile-terminating on a downlink.

4. The method of claim 3, further comprising initiating the data session on the first connection prior to establishing the second connection to the network node over the second network using the second RAT.

5. The method of claim 3, further comprising monitoring the downlink for the arrival of data, on the first RAT.

6. The method of claim 1, wherein the first optimization criteria is a power saving criteria.

7. The method of claim 1, wherein the second optimization criteria is a high throughput criteria.

8. The method of claim 1, wherein, in idle mode, the wake-up frequency of the first RAT is lower than a corresponding wake-up frequency of the second RAT.

9. The method of claim 1, wherein, in active mode, the throughput of the second RAT is higher than a corresponding throughput of the first RAT.

10. The method of claim 1, wherein the second criteria is considered when the first data connection is active.

* * * * *